United States Patent [19]

Abatzoglou et al.

[11] Patent Number: 5,744,710

[45] Date of Patent: Apr. 28, 1998

[54] FAST MAXIMUM LIKELIHOOD PROCESSOR FOR MEANS WIND VELOCITY ESTIMATION

[75] Inventors: Theagenis John Abatzoglou, Cupertino; Chao Huang, Mountain View; Bruce Steakley; Jung Kenneth, both of Cupertino, all of Calif.

[73] Assignee: Lockheed Martin Corp., Sunnyvale, Calif.

[21] Appl. No.: 785,364

[22] Filed: Jan. 17, 1997

[51] Int. Cl.[6] .................................................. G01F 13/00
[52] U.S. Cl. ................................. 73/170.11; 342/26
[58] Field of Search ........................ 73/170.07, 170.11, 73/170.16, 861.85; 342/26

[56] References Cited

U.S. PATENT DOCUMENTS

| | | | |
|---|---|---|---|
| 3,340,528 | 9/1967 | Atlas | 342/26 |
| 4,996,533 | 2/1991 | May et al. | 73/170.11 X |
| 5,276,453 | 1/1994 | Heymsfield et al. | 342/112 |
| 5,394,155 | 2/1995 | Rubin et al. | 342/26 X |
| 5,539,409 | 7/1996 | Matthews et al. | 342/26 |
| 5,648,782 | 7/1997 | Albo et al. | 342/26 |

Primary Examiner—George M. Dombroske
Assistant Examiner—Paul D. Amrozowicz
Attorney, Agent, or Firm—Feix & Feix; Henry Groth

[57] ABSTRACT

A real time maximum likelihood estimator (MLE) processor employs a table look-up mechanism to eliminate the MLE computation complexity. The real time MLE processor can be implemented with digital signal processing (DSP) chips in a personal computer. Optimally accurate estimates of mean wind velocity are obtained at all signals and noise ratios (SNR) using fast software algorithms.

16 Claims, 9 Drawing Sheets

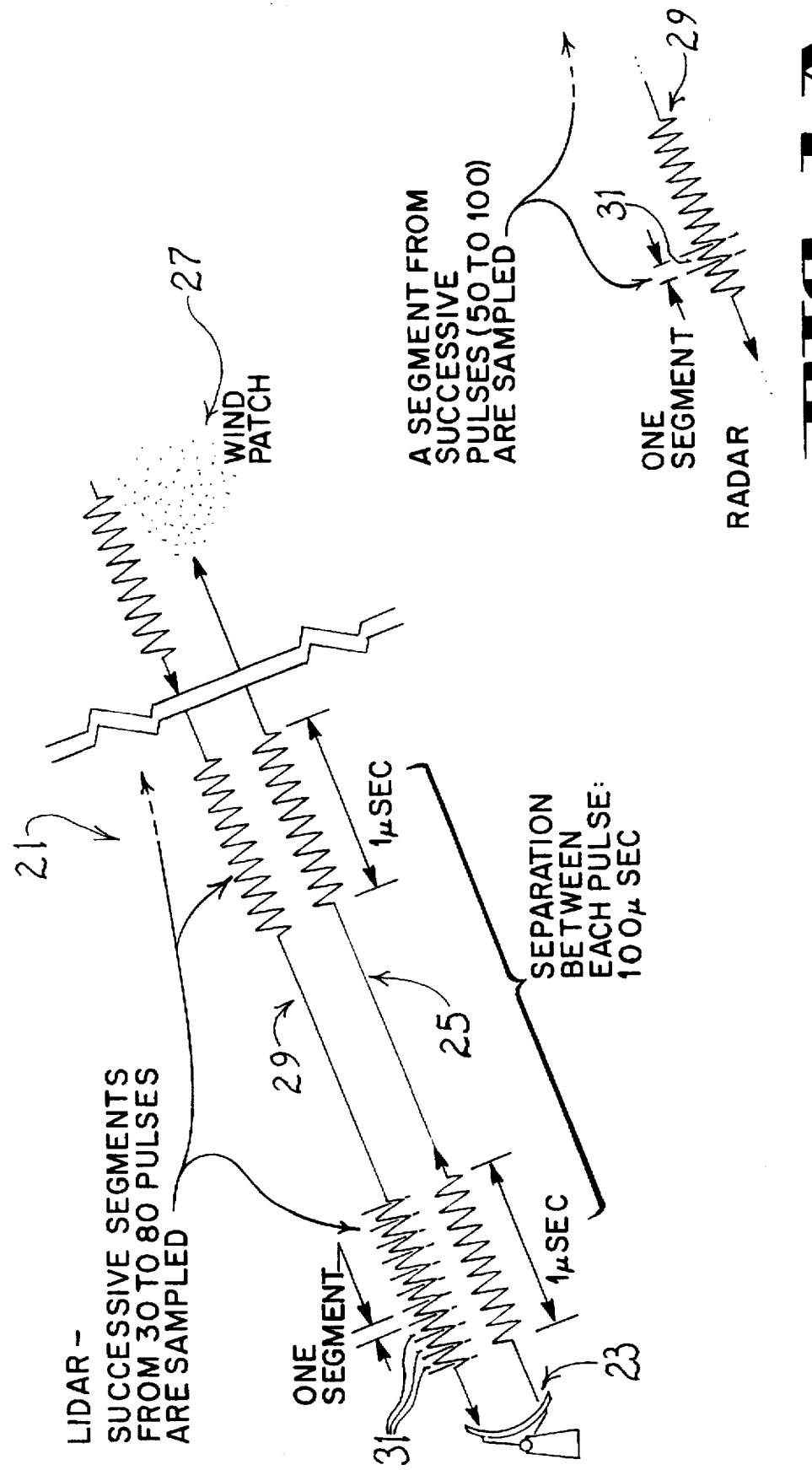

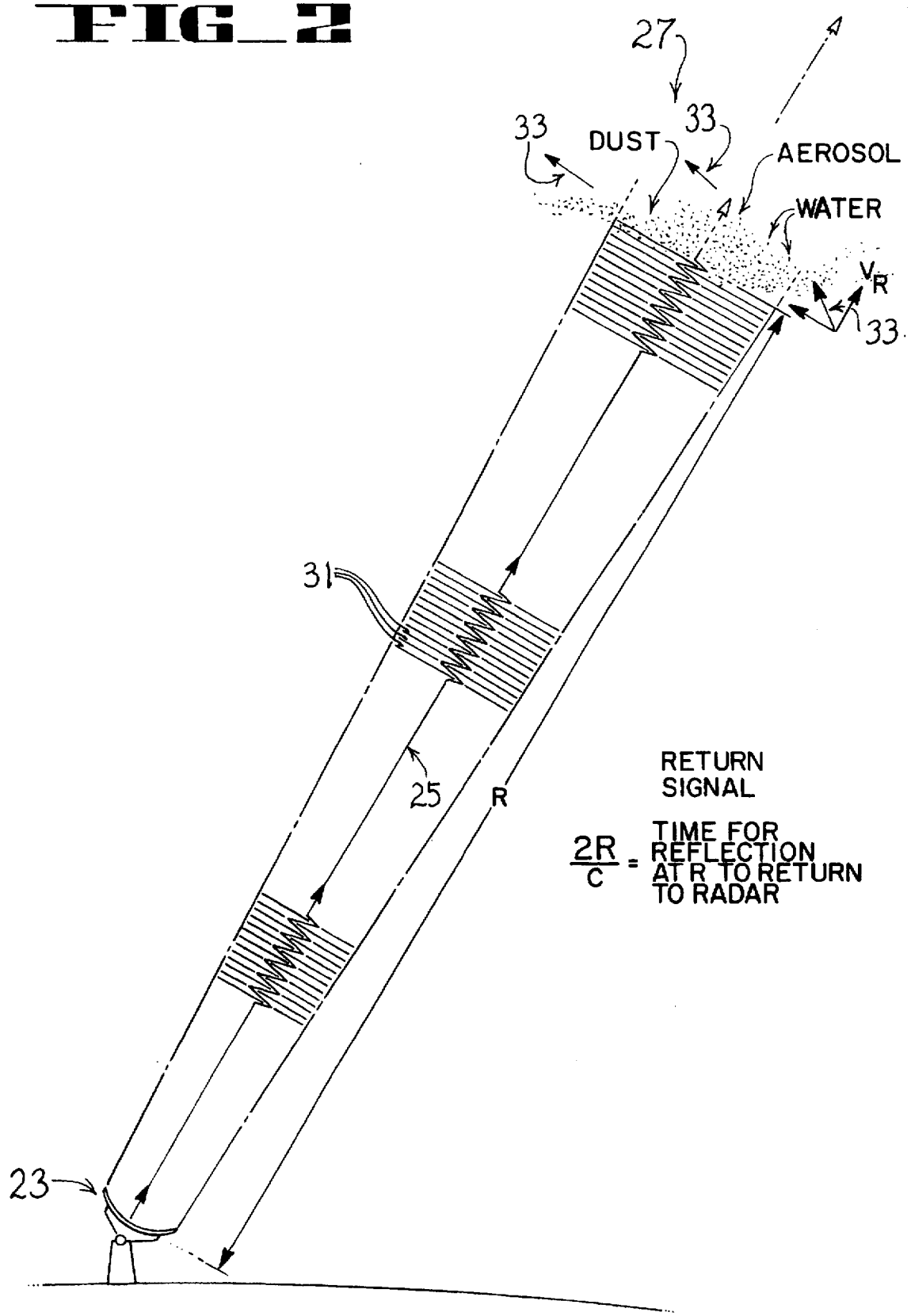

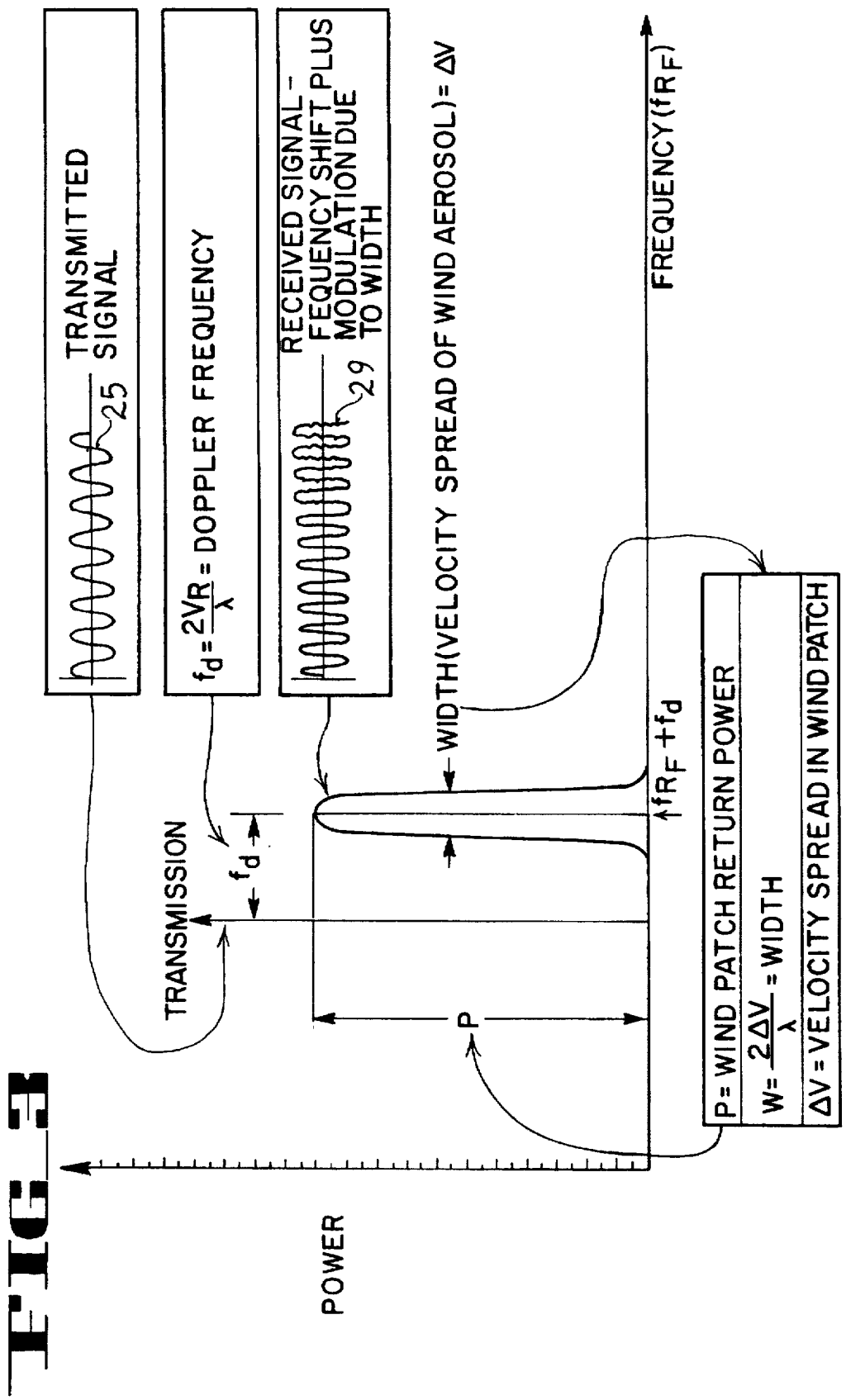

FIG_4
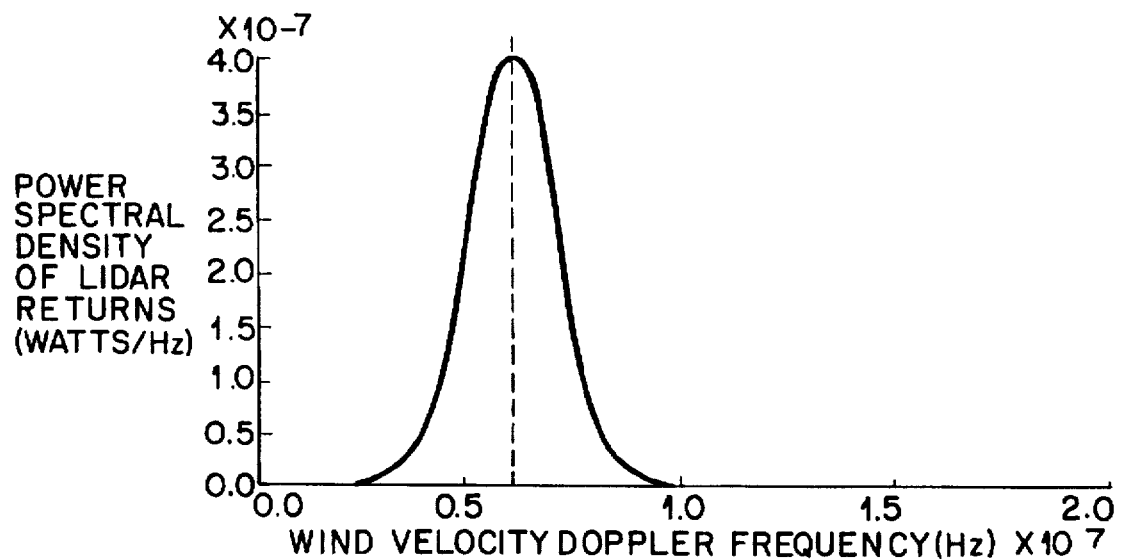
FIG_5
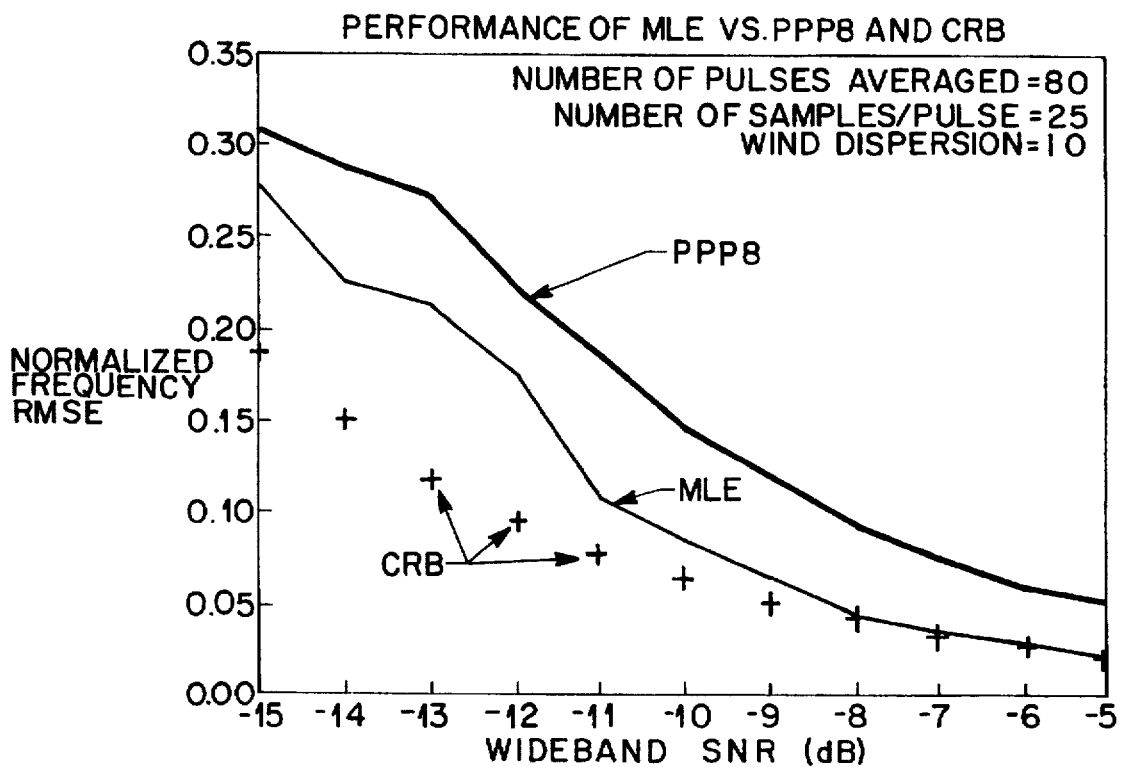

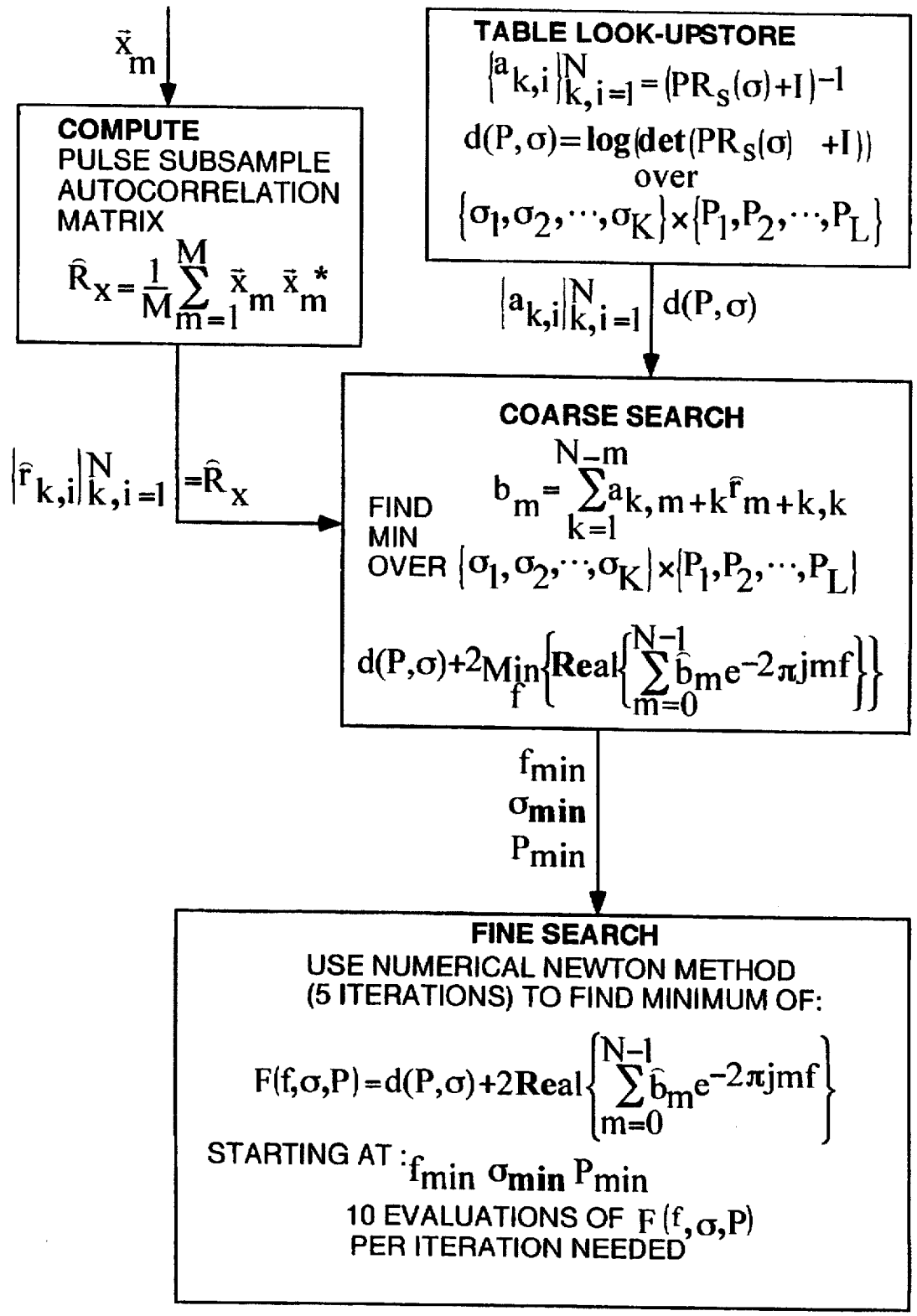

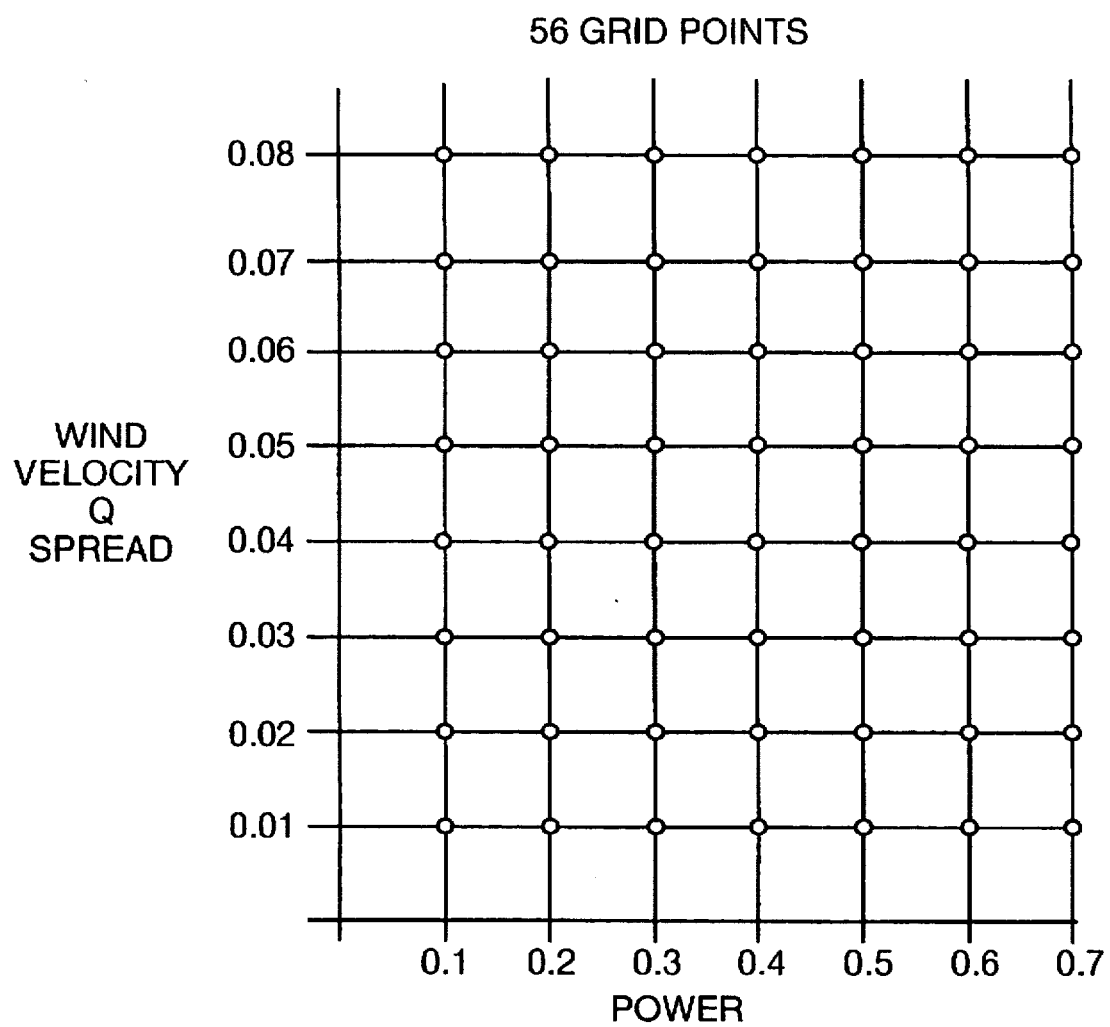
FIG_7
EXAMPLE OF COARSE SEARCH GRID FOR MLE

FIG_8
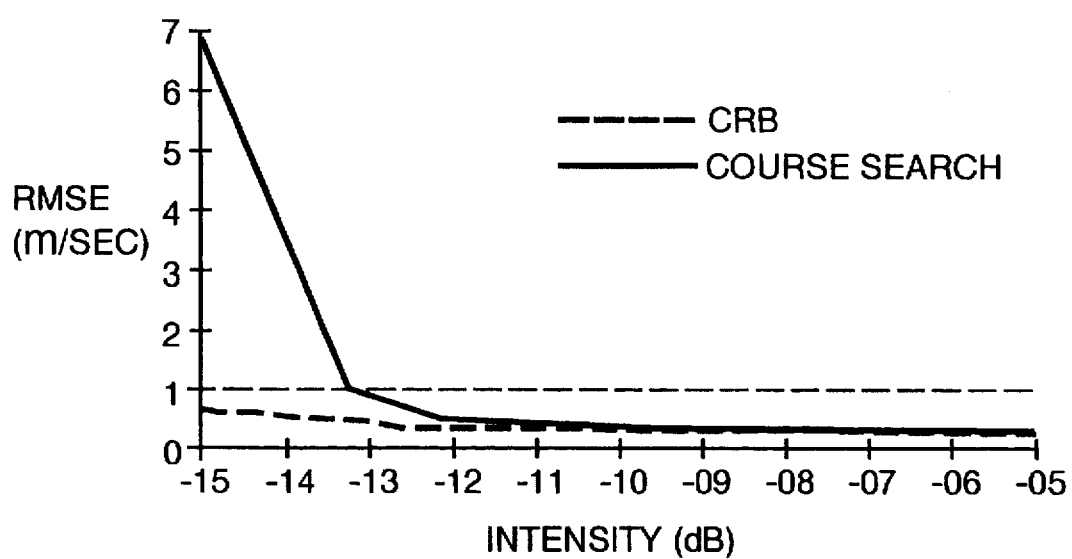

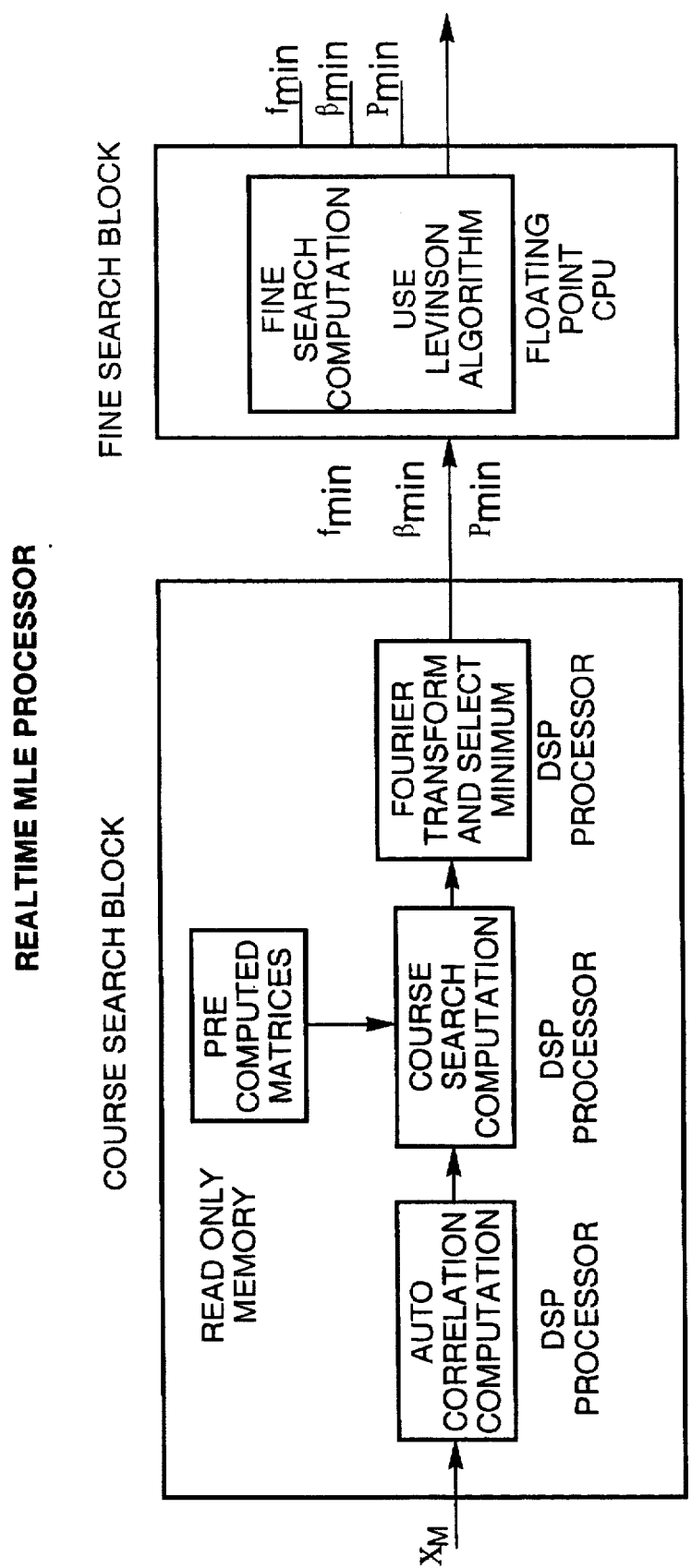
FIG_9

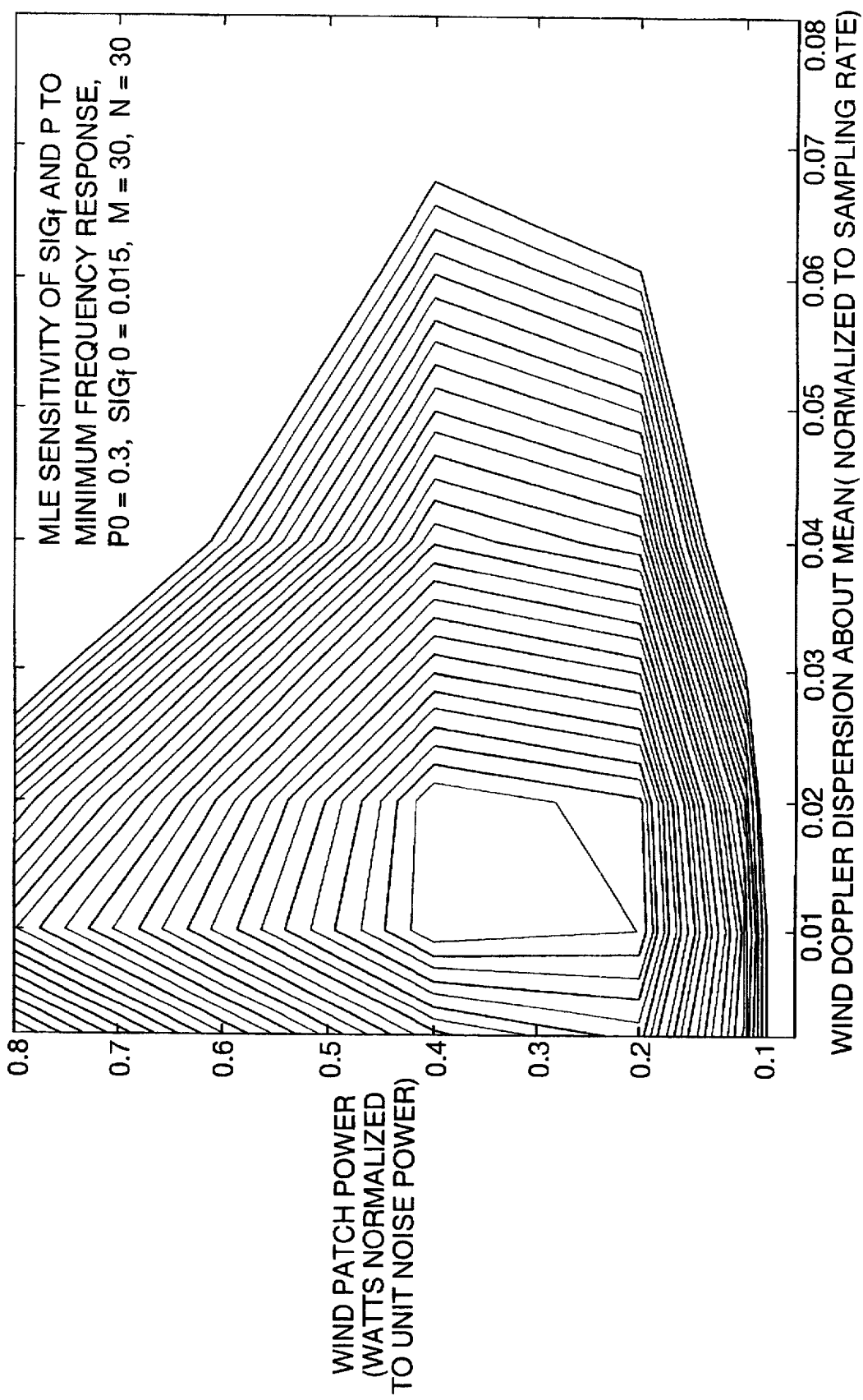
FIG_10

5,744,710

FAST MAXIMUM LIKELIHOOD PROCESSOR FOR MEANS WIND VELOCITY ESTIMATION

BACKGROUND OF THE INVENTION

This invention relates to methods and apparatus for providing a fast, real time and optimally accurate signal processor for estimating mean wind velocity, velocity dispersion (width) about the mean and power of the return from returns of pulsed LIDAR and RADAR radiation transmitted to and received from a small wind patch in space.

This invention relates particularly to methods and apparatus for providing a fast maximum likelihood estimation of those parameters of the wind patch.

A maximum likelihood estimator (MLE) algorithm is computational intensive. Prior methods and apparatus for achieving a real time MLE processor were not realizable without many parallel processors.

Prior algorithms also were not very accurate at medium to low signal to noise ratios (SNR).

Prior algorithms also did not estimate wind velocity dispersion adequately.

SUMMARY OF THE PRESENT INVENTION

The methods and apparatus of the present invention yield optimally accurate estimates of mean wind velocity at all SNRs.

The present invention also optimally estimates standard deviation of wind dispersion and wind patch return power at all SNRs.

In the present invention a real time MLE processor employs a table look-up mechanism to eliminate the MLE computation complexity.

In the present invention the real time MLE processor can be implemented with digital signal processing (DSP) chips in a personal computer.

The methods and apparatus of the present invention provide optimally accurate estimation of mean wind velocity using fast software algorithms.

Methods and apparatus of the present invention provide an optimized, real time, processor card implementation.

In the method and apparatus of the present invention a pulsed beam of radiation having a selected frequency is transmitted to the small wind patch. The returned, pulsed beam of radiation which is reflected back (from the aerosols present in the small wind patch) is received for processing by the methods and apparatus of the present invention. The wind patch returns from a RADAR/LIDAR are accurately modeled by a Gaussian random process with a Gaussian power spectral density of unknown mean, standard deviation and power.

The maximum likelihood estimator (MLE) of the unknown parameters is analyzed, its performance is compared against other estimators of the mean wind velocity and the corresponding Cramer-Rao Bound (CRB). The CRB provides the lowest possible bound on the variance of any unbiased estimation of the parameters. A simplification of the CRB results in the computation of the variance of mean wind velocity uncoupled from the return and wind velocity dispersion.

A pulsed sub-sample autocorrelation matrix is stored in a table look-up.

The table look-up comprises fixed power and velocity spread values.

A coarse search of the received pulsed beam of radiation uses the autocorrelation matrix in the table look-up to minimize the likelihood function of the wind spread values and power values over the Doppler frequency component.

A fine search is then performed to find the absolute minimum of all of the power, the wind radial velocity and velocity spread variables in the wind patch. The fine search is started at the best point provided by the coarse search.

Methods and apparatus which incorporate the features described above and which are effective to function as described above constitute specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a pictorial view showing how a pulsed beam of radiation is transmitted to a small wind patch and is then reflected, from aerosols within the wind patch, back to the receiving station. The received beam of radiation is processed to provide a fast maximum likelihood estimation of the power, the instantaneous radial mean wind velocity, and the wind velocity spread variables in the wind patch. In FIG. 1 the pulsed beam is a LIDAR beam, and the beam is divided into successive segments so that the successive segments can be sampled and their autocorrelation formed.

FIG. 1A is a view like FIG. 1 but shows how a single segment from each pulse is taken as a sample when the beam is a RADAR beam. These single, related sample segments from a number of pulses are then used to form the autocorrelation function.

As illustrated in FIGS. 1 and 1A, the pulsed beam of radiation in the present invention may be either a pulsed LIDAR beam (FIG. 1) or a pulsed RADAR beam (FIG. 1A).

FIG. 2 is a view like FIG. 1 but showing details of how the $V_R$ component (the radial velocity component) is obtained.

FIG. 3 is a plot of power versus frequency and illustrates modeling of the received, pulsed beam of radiation as a Gaussian power spectral density which enables the power, wind radial velocity and velocity spread variables in the wind patch to be obtained.

FIG. 4 is an enlarged detailed view of the power spectral density of a LIDAR wind return. In FIG. 4 the spectral density has a mean frequency $f_0$ and a Gaussian shape with its standard deviation being the wind dispersion.

FIG. 5 is a graph showing that the maximum likelihood estimation (MLE) technique of the present invention (the lower, solid line curve in FIG. 5) has a substantial advantage compared to the Poly-Pulse-Pair (PPP) techniques (the upper, dashed line curve in FIG. 5) at lower signal to noise ratios (SNR).

FIG. 6 is a block diagram showing the functional components of the fast maximum likelihood estimation technique of the present invention. FIG. 6 illustrates how the coarse search uses the table look-up store to eliminate computation complexity and to enable optimally accurate estimates of mean wind velocity to be obtained in real-time in accordance with the present invention.

FIG. 7 is a course search grid for MLE showing how the look-up store enables minimum values of wind power and wind spread to be obtained quickly in accordance with the present invention.

FIG. 8 is a graph showing a comparison of the results of the course search of the present invention (the solid line in FIG. 8) with respect to the results of the theoretical Cramer-Rao Bound (CRB).

FIG. 9 is a block diagram showing how the coarse search can be performed by three separate digital signal processors (DSP), with each digital signal processor being dedicated to the particular computation shown in FIG. 9.

FIG. 10 is a graph of wind-patch power verses wind Doppler dispersion about a mean and shows how (as long as the contours are convex with respect to both power and wind spread) the results of the coarse search can be further processed by the free search illustrated in FIG. 6.

DETAILED DESCRIPTION OF THE PREFERRED EMBODIMENTS

The method and apparatus of the present invention provide a fast maximum likelihood estimation of the power, the instantaneous wind radial velocity, and the velocity spread of a small wind patch in space.

It is important to measure mean wind velocity and its dispersion and gradients for precision air drop systems, weather analysis, turbulence wind shear detection and general wind behavior.

RADAR/LIDAR systems are used to detect returns from wind patches and to estimate their velocity, wind velocity spread, power of the return and wind velocity fields.

A LIDAR system has advantages of beam pointing accuracy and small volume scan.

A RADAR system usually has a longer range of operation.

Another difference is that the RADAR must process several pulses coherently to estimate the Doppler frequency spectrum in the wind return.

The LIDAR return, because of its much larger frequency of operation, has a very substantial Doppler frequency shift which can be measured within sub samples of a single pulse return.

Wind returns can be physically modeled by a stochastic random Gaussian process exploiting larger sample properties of the return components. This process can also be thought as stationary over limited volume and space. Because of the wind velocity, the return has a Doppler frequency shift which can be measured to estimate an average wind radial velocity over the field in question.

The velocity dispersion in the return may be minimal, in which case the return can be modeled by essentially a sinusoid of unknown amplitude, phase and frequency.

If the dispersion is significant, as happens in a turbulent scenario, the return is better modeled as a Gaussian random process of a certain spectral width and shape characterizing the distribution of the velocity dispersion. In this case, the wind velocity is characterized by its mean and width of spread.

A Gaussian shape is used to model the power spectral density of the process.

Proposed estimations of wind's velocity include techniques like the periodogram, poly-pulse pair correlation, autoregressive and maximum likelihood.

The Cramer-Rao Bound (CRB) has been derived for the Gaussian process return and can be used to compare the performance of the estimators at medium or high signal-to-noise ratios (SNR).

As noted above, applications of wind velocity estimations include: weather analysis, turbulence wind shear detection, precision guidance and others.

In the method and apparatus of the present invention, wind patch returns from a RADAR/LIDAR are accurately modeled by a Gaussian random process with a Gaussian power spectral density of unknown mean, standard deviation and power.

The maximum likelihood estimator (MLE) of the unknown parameters is analyzed, its performance is compared against other estimators of the mean wind velocity and the corresponding Cramer-Rao Bound (CRB). The MLE of the present invention has superior performance to the Poly-Pulse-Pair (PPP) techniques at all signal-to-noise-ratios (SNR).

The method and apparatus of the present invention also presents a simplification of the CRB that results in the computation of the variance of mean wind velocity uncoupled from the return and wind velocity's dispersion.

It is crucial to extend the range of application of the wind velocity estimation algorithm to the longest possible distance for a fixed laser transmitted power. For this purpose, it is expedient to use wind velocity estimation algorithms that exhibit the most robust and accurate performance at lower signal-to-noise-ratios (SNR).

In the present invention, wind LIDAR returns are accurately modeled as samples from a stochastic Gaussian random processes which is characterized by its zero mean and a Gaussian power spectral density of mean equal to the wind velocity Doppler frequency and standard deviation equal to the wind dispersion in Hz.

The MLE algorithm is, according to the theory of statistical signal processing, the most accurate and robust algorithm for estimating these wind parameters. The main reason is that it fully exploits the model based aspect of the given LIDAR measurements.

In the description of the preferred embodiments, the initial description will concentrate on the LIDAR sensor.

In FIG. 1 a LIDAR system for practicing one embodiment of the method and apparatus of the present invention is indicated by the general reference numeral 21.

The system 21 includes a transmitter 23 for transmitting a pulsed beam of radiation 25 to a wind patch 27.

As illustrated in FIG. 1 the pulsed beam is a LIDAR beam, and the beam is divided into successive segments so that the successive segments are used to compute the autocorrelation function and averaged over successive pulses (as described in more detail below with reference to FIG. 2 and FIG. 3).

The transmitted, pulsed beam of radiation is reflected, from aerosols within the wind patch 27, back to the receiving station. In the FIG. 1 embodiment the receiving station is the same station as the transmitting station 23.

The reflected beam is indicated by the reference numeral 29 in FIG. 1.

In accordance with the present invention, the reflected, received beam of radiation 29 is processed to provide a fast maximum likelihood estimation of the power, the instantaneous radial wind velocity, and the velocity spread variables in the wind patch 27.

The pulsed, LIDAR beam 25 in FIG. 1 is divided into successive segments 31 so that the successive segments can be used to derive the autocorrelation and averaged over successive pulses.

FIG. 1A is a fragmentary view showing how a pulsed, RADAR beam is also divided into segments. In the case of RADAR beam, however, a single segment is taken from each pulse from the matched filter output; and single, related sample segments from a number of pulses are then used to compute the autocorrelation function.

As illustrated in FIG. 2 the wind patch 27 may have a wind velocity moving in the direction indicated by the direction arrows 33; and, in this event, the radial wind velocity is indicated by the component $V_R$. The time for the signal to return from the distance R of the wind patch from the transmitter 23 is given by the formula 2R/c, where c is the speed of light.

FIG. 3 shows in graphic form a number of functional relationships between the frequency of the transmitted signal 25, the frequency of the received signal 29, the modulation of the received signal 29 resulting from movement of the aerosols in the wind patch 27, the effect of wind velocity spread of wind aerosol on the width of the Gaussian power spectral density curve, and the amplitude P of the wind patch return power of the Gaussian power spectral density model.

The $\Delta V$ is an indication of the turbulence in the wind patch 27.

The receiving station 23 includes an analog to digital (A/D) output for the received LIDAR wind returns.

The received LIDAR wind returns 29 are modeled at the output of the A/D as:

$x_n = \exp(2\pi j n T f_0) s_n + v_n$; n=1, . . . , N

N=# of samples within a pulse length $f_0$=mean Doppler frequency of wind patch under observation $s_n$=sample of wind return at time nT; modeled as a random process with gaussian power spectral density $v_n$=amplifier+electronics noise T=intrapulse sampling period An example of the Gaussian power spectral density of the signal appears in FIG. 4.

The MLE algorithm is defined as follows:

Let the samples over a pulse return be expressed in vector/matrix notation as $$\vec{x} = \begin{bmatrix} x_1 \\ \cdot \\ \cdot \\ \cdot \\ x_N \end{bmatrix} = E(f_0)\vec{s} + \vec{v};$$

where $$E(f_0) = diag(e^{2\pi j f_0}, \ldots, e^{2\pi j N f_0}); \quad \vec{s} = \begin{bmatrix} s_1 \\ \cdot \\ \cdot \\ \cdot \\ s_N \end{bmatrix} \text{ and } \vec{v} = \begin{bmatrix} v_1 \\ \cdot \\ \cdot \\ \cdot \\ v_N \end{bmatrix}$$

The autocorrelation matrix of I is then obtained as $$R_x(P,\sigma_f,f_0) \equiv E\{\vec{x}\vec{x}^*\} = E(f_0)E\{\vec{s}\vec{s}^*\}E(f_0)^* + \sigma^2 I = E(f_0)R_s(P,\sigma_f)E(f_0)^* + \sigma^2 I$$

$\vec{x}$ is a zero mean, complex gaussian vector random variable and its probability density is given by $$p(\vec{x}|P, \sigma_f, f_0) = \frac{1}{\pi^N det(R_x(P, \sigma_f, f_0))} \exp[-\vec{x}^* R_x^{-1}\vec{x}]$$

here $R_s(P,\sigma_f)$ is the signal autocorrelation matrix at 0 frequency having power P and wind dispersion $\sigma_f$.

$\sigma^2$=Variance of electronic/amplifier noise.

$$R_s(P,\sigma_f) = P R_s(\sigma_f); \quad R_s(\sigma_f) = \{\exp(-2[\pi(m-n)\sigma_f T]^2)\}^N_{m,n=1}$$

The MLE maximizes the Likelihood function in terms of P, $\sigma_f$, $f_0$.

$$p(\vec{x}|P, \sigma_f, f_0) = \frac{1}{\pi^N det(R_x(P, \sigma_f, f_0))} \exp[-\vec{x}^* R_x^{-1}\vec{x}]$$

When M distinct LIDAR snapshots returns $\vec{x}_m$ are available the MLE becomes $$\underset{P,\sigma_f,f_0}{Min} \{\ln(det(R_s(P,\sigma_f) + \sigma^2 I)) + trace\{R_x(P,\sigma_f,f_0)^{-1}\hat{R}_x\}\}$$

where $$\hat{R}_x = \frac{1}{M} \sum_{m=1}^{M} \vec{x}_m \vec{x}_m^* =$$

is the sampled autocorrelation matrix.

The minimization required for the MLE can be implemented by fast and efficient algorithms based on the Newton method using judiciously selected starting points for the Newton iteration.

An optimized coarse search (see FIGS. 6, 7 and 9) is used first to select points for starting the Newton method. FIG. 7 provides an example of a coarse search grid.

Convergence (see FIG. 10) is attained usually in a few iterations.

Another outstanding attribute of the MLE method is that at moderate SNR its estimation mean square error (MSE) attains the Cramer-Rao Bound (CRB). See FIG. 8.

The CRB is the lowest possible bound on the MSE for an unbiased estimator of the parameters in questions given a set of observations/samples.

The CRB can be computed in closed form, and it is an absolute measure of goodness of any estimator.

Comparison between the Poly-Pulse-Pair approach and MLE

The MLE was compared to the Poly-Pulse-Pair (PPP) 8 lag algorithm for a wind scenario consisting of 80 pulses, each having 25 samples. The wind velocity spread about the mean was set at 10 m/sec. The wavelength was set at 2 microns and the sampling rate at 50 MHz. Five hundred Monte-Carlo trials per SNR were performed for SNR varying from −15 to −5 dB. It can be seen that the MLE outperforms the PPP technique by about 3 dB and it remains close to the CRB up to −10 dB.

For smaller wind dispersion the MLE algorithm is still superior to the PPP, but not by the margin obtained in this particular scenario.

FAST IMPLEMENTATION

This consists of a coarse search followed by a fine search. Each search has to be optimized as to provide optimal (MLE) performance with the least number of computations. We must take advantage of the processor architecture and ROM available.

Coarse Search

The coarse search of the present invention uses (as illustrated in FIG. 7) a minimal grid: $\{\sigma_1, \sigma_2, \ldots, \sigma_K\} \times \{P_1, P_2, \ldots, P_L\}$ of coarse search sampling points such that partial MLE evaluation provides approximate staring point for fine search of MLE $$Min \{F(f,\sigma,P)\} = f$$

$$\log(det(PR_s(\sigma)+1)) + Min\{trace\{(PR_s(\sigma)+1)^{-1}E^*(f)\hat{R}_x E(f)\}\} = f$$

$$\log(det(PR_s(\sigma)+1)) + 2\,Min\left\{Real\left\{\sum_{m=0}^{N-1}\hat{b}_m e^{-2\pi jmf}\right\}\right\}$$

where $$F(f, \sigma, P) = \log(det(PR_s(\sigma)+1)) + trace\{(PR_s(\sigma)+1)^{-1}E^*(f)\hat{R}_x E(f)\}$$

Call frequency at minimum above: $f(\sigma, P)$.

This produces triplets: $\{f(\sigma_i, P_j), \sigma_i, P_j\}$; we keep the one that yields the minimum of F. This is used at the beginning of fine search. Here $\hat{b}_m = b_m$ for $m \geq 1$, and $\hat{b}_0 = \frac{1}{2}b_0$ where $$b_m = \sum_{k=1}^{N-m} a_{k,m+k}^p \hat{r}_{m+k,k}$$

and $[a_{k,i}]_{k,i=1}{}^N = (PR_s(\sigma)+1)^{-1}$ and $[\hat{r}_{k,i}]_{k,i=1}{}^N = \hat{R}_x$ $$\hat{R}_x = \frac{1}{M}\sum_{m=1}^{M}\vec{x}_m\vec{x}_m^* =$$

Pulse Subsample Autocorrelation Matrix

Both $\log(det(PR_s(\sigma)+1))$ and $[a_{k,i}]_{k,i-1}{}^N = (PR_s(\sigma)+1)^{-1}$ are prestored in a look-up table.

An example of a $\{dispersion\} \times \{Power\}$ coarse grid is: $\{0.002\ 0.01\ 0.02\ 0.04\ 0.08\} \times \{0.05\ 0.1\ 0.2\ 0.4\ 0.8\}$

Fine Search

The fine search (see FIGS. 6 and 9) uses the Newton-Ralphson method (3–4 iterations) starting at best point provided by coarse search. This is best implemented by numerical computations of gradient and Hessian. Here we take advantage of the Toeplitz structure of the theoretical Autocorrelations matrix $(PR_s(\sigma)+1)$ to compute its and determinant using the Levinson-Trench-Zohar algorithm. This allows to compute the inverse and determinant of the Autocorrelation matrix of $N^2$ rather than $N^3$ flops.

The Newton method is defined by iterations:

$$\begin{bmatrix} f_{n+1} \\ \sigma_{n+1} \\ P_{n+1} \end{bmatrix} = \begin{bmatrix} f_n \\ \sigma_n \\ P_n \end{bmatrix} - \nabla^2 F(f_n,\sigma_n,P_n)^{-1}\nabla F(f_n,\sigma_n,P_n)$$

where $$\nabla F(f_n,\sigma_n,P_n) \equiv \begin{bmatrix} \frac{\partial F}{\partial f} \\ \frac{\partial F}{\partial \sigma} \\ \frac{\partial F}{\partial P} \end{bmatrix}_{\substack{f=f_n \\ \sigma=\sigma_n \\ P=P_n}}$$

is the gradient of F $$\nabla^2 F(f_n,\sigma_n,P_n) \equiv \begin{bmatrix} \frac{\partial^2 F}{\partial^2 f} & \frac{\partial^2 F}{\partial f \partial \sigma} & \frac{\partial^2 F}{\partial f \partial P} \\ \frac{\partial^2 F}{\partial f \partial \sigma} & \frac{\partial^2 F}{\partial^2 \sigma} & \frac{\partial^2 F}{\partial \sigma \partial P} \\ \frac{\partial^2 F}{\partial f \partial P} & \frac{\partial^2 F}{\partial \sigma \partial P} & \frac{\partial^2 F}{\partial^2 P} \end{bmatrix}_{\substack{f=f_n \\ \sigma=\sigma_n \\ P=P_n}}$$

is the Hessian of F

First we present a numerical computation of the gradient and Hessian.

$$\frac{\partial F}{\partial f} \approx \frac{1}{\Delta f}(F(f+\Delta f/2,\sigma,P) - F(f-\Delta f/2,\sigma,P))$$

Similarly for the full derivatives $$\frac{\partial F}{\partial \sigma} \approx \frac{1}{\Delta \sigma}(F(f,\sigma+\Delta\sigma/2,P) - F(f,\sigma-\Delta\sigma/2,P))$$

and $$\frac{\partial F}{\partial P} \approx \frac{1}{\Delta \sigma}(F(f,\sigma,P+\Delta P/2) - F(f,\sigma,P-\Delta P/2))$$

$$\frac{\partial^2 F}{\partial^2 f} \approx \frac{1}{\Delta f^2}(F(f+\Delta f,P) - 2F(f,\sigma,P) + F(f-\Delta f,\sigma,P))$$

$$\frac{\partial^2 F}{\partial f \partial \sigma} \approx \frac{1}{\Delta f \Delta \sigma}(F(f+\Delta f,\sigma+\Delta\sigma,P) - F(f+\Delta f,\sigma,P) - F(f,\sigma+\Delta\sigma,P) + F(f,\sigma,P))$$

and similarly for other mixed partial derivatives. The differential increments must be taken small enough. Typically:

$$|\Delta f| \leq \frac{1}{10N}\ ;\ |\Delta\sigma| \leq \frac{1}{10N}\ ;\ |\Delta P| \leq \frac{1}{50}\ ;$$

These numerical evaluations make full use of the of the Toeplitz nature of the Autocorrelation matrix to compute its inverse and determinant.

It should be noted that the first function of the MLE evaluation (as set out under the title "Coarse Search") is a complicated function which the present invention succeeds in minimizing. This function involves the Doppler frequency and speed power. The function in a highly non-linear function of the three parameters which needs to be minimized. Unless a special effort is made to simplify the minimization, a long computation effort is required.

The present invention presents a good simplification for this particular problem.

The present invention permits a real time MLE processor to be realized without using many parallel processors.

The present invention also provides excellent accuracy at medium to low SNR.

The present invention yields optimally accurate estimates of mean wind velocity at all SNRs.

The present invention also estimates standard deviation of wind dispersion and wind patch return power.

The present invention utilizes a real time MLE processor which employs a table look-up mechanism to eliminate the MLE computation complexity.

The real time MLE processor of the present invention can be implemented with Digital Signal Processing (DSP) chips in a personal computer. See FIG. 9.

The present invention provides an optimally accurate estimator of mean wind velocity using fast software algorithms.

The present invention permits an optimized, real time, processor card implementation.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of providing a fast maximum likelihood estimation of the power, the instantaneous wind radial velocity, and the velocity spread of a small wind patch in space, said method comprising, transmitting a pulsed beam of radiation having a selected frequency to the small wind patch, capturing a returned pulsed beam of radiation which is reflected back from aerosols present in the small wind patch, said returned pulsed beam of radiation having a Gaussian power spectral density comprising, (a) an amplitude which is related to the wind path return power, (b) a frequency which is higher than the transmitted frequency by the amount of a Doppler frequency component and which Doppler frequency component can be used to estimate an average wind radial velocity over the wind patch, and (c) a width which is a function of the velocity spread wind aerosols, storing a pulsed sub-sample autocorrelation matrix in a table look-up, said table look-up comprising fixed power and velocity spread values, performing a coarse search of the received pulsed beam of radiation using the autocorrelation matrix in the table look-up to minimize a likelihood function of wind spread values and power values over the Doppler frequency component, and then performing a fine search to find the absolute minimum of all of the power, wind radial velocity and velocity spread variables in the wind patch, and wherein the performing of the coarse search includes, performing an autocorrelation computation of the returned pulsed beam, performing a coarse search computation using the table look-up, and performing a fast Fourier transform and select minimums computation.

2. The invention defined in claim 1 wherein the pulsed beam of radiation is a LIDAR beam and wherein the beam is divided into samples so that an autocorrelation function sampled can be computed.

3. The invention defined in claim 1 wherein the transmitted radiation is a RADAR beam that is pulsed in distinct time intervals and wherein each pulsed time interval is divided into segments and wherein a single, related segment in each interval is sampled so that the samples can be used to compute a sampled autocorrelation function for the coarse search and the fine search.

4. The invention defined in claim 1 wherein the transmitted beam is a LIDAR beam and wherein the Gaussian model of the received beam is searched with the statistical principle of maximum likelihood to produce optimal estimates of power and velocity spread.

5. The invention defined in claim 4 wherein the fine search takes advantage of the Toeplitz structure of the autocorrelation matrix and uses the Levinson-Trench-Zohar algorithm and the Newton method to find said absolute minimum.

6. The invention defined in claim 1 wherein the coarse search is performed by three separate digital signal processors.

7. The invention defined in claim 6 wherein the first digital signal processor performs an autocorrelation computation, the second digital signal processor performs the coarse search computation using the precomputed matrixes in the table look-up, and the third digital signal processor performs a fast Fourier transform and select minimums computation of the velocity spread values and power values over the Doppler frequency component.

8. The invention defined in claim 6 wherein the fine search is performed by a computer which uses the Levinson-Trench-Zohar algorithm to find said absolute minimum.

9. Apparatus for providing a fast maximum likelihood estimation of the power, the instantaneous wind radial velocity, and the velocity spread of a small wind patch in space, said apparatus comprising, transmitting means for transmitting a pulsed beam of radiation having a selected frequency to the small wind patch, receiving means for capturing a returned pulsed beam of radiation which is reflected back from aerosols present in the small wind patch, said returned pulsed beam of radiation having a Gaussian power spectral density comprising, (a) an amplitude which is related to the wind path return power, (b) a frequency which is higher than the transmitted frequency by the amount of a Doppler frequency component and which Doppler frequency component can be used to estimate an average wind radial velocity over the wind patch, and (c) a width which is a function of the velocity spread wind aerosols, storage means for storing a pulsed sub-sample autocorrelation matrix in a table look-up, said table look-up comprising fixed power and velocity spread values, coarse search means for performing a coarse search of the received pulsed beam of radiation using the autocorrelation matrix in the table look-up to minimize a likelihood function of wind spread values and power values over the Doppler frequency component, and fine search means for performing a fine search to find the absolute minimum of all of the power, wind radial velocity and velocity spread variables in the wind patch, and wherein the coarse search means include, autocorrelation computing means for performing an autocorrelation computation of the returned pulsed beam, coarse search computing means for performing a coarse search computation using the table look-up, and Fourier transform computing means for performing a fast Fourier transform and select minimums computation.

10. The invention defined in claim 9 wherein the pulsed beam of radiation is a LIDAR beam and wherein the beam is divided into samples so that the samples in each transmitted interval can be used to compute a sample autocorrelation function.

11. The invention defined in claim 9 wherein the transmitted radiation is a RADAR beam that is pulsed in distinct time intervals and wherein each pulsed time interval is divided into segments and wherein a single, related segment in each interval is sampled so that a sampled autocorrelation function can be formed for the coarse search and the fine search.

12. The invention defined in claim 9 wherein the transmitted beam is a LIDAR beam and wherein the Gaussian model of the received beam is searched on the statistical principle of maximum likelihood to produce optimal estimates of power and width.

13. The invention defined in claim 12 wherein the fine search takes advantage of the Toeplitz structure of the autocorrelation matrix and uses the Levinson-Trench-Zohar algorithm and the Newton method to find said absolute minimums.

14. The invention defined in claim 9 wherein the coarse search means comprise three separate digital signal processors.

15. The invention defined in claim 14 wherein the first digital signal processor performs an autocorrelation computation, the second digital signal processor performs the coarse search computation using the precomputed matrixes in the table look-up, and the third digital signal processor performs a fast Fourier transform and select minimums computation of the velocity spread values and power values over the Doppler frequency component.

16. The invention defined in claim 14 wherein the fine search means comprise a computer which uses the Levinson-Trench-Zohar algorithm to find said absolute minimums.

* * * * *

UNITED STATES PATENT AND TRADEMARK OFFICE
CERTIFICATE OF CORRECTION

PATENT NO. : 5,744,710
DATED : Apr. 28, 1998
INVENTOR(S) : Theagenis Abatzoglou, et al It is certified that error appears in the above-identified patent and that said Letters Patent is hereby corrected as shown below:

On the title page, item [54] and column 1, line 2:

In the title: "Means" should read -- Mean --

On the title page, item [75]:

Inventors: "Jung Kenneth" should read -- Kenneth Jung --

Column 6, Line 1: "I" should read -- $\bar{\vec{x}}$ --

Signed and Sealed this

Sixth Day of October, 1998

*Attest:*

BRUCE LEHMAN

*Attesting Officer*  *Commissioner of Patents and Trademarks*